United States Patent
Fechner

(10) Patent No.: US 7,602,680 B2
(45) Date of Patent: Oct. 13, 2009

(54) FOCUS CONTROL FOR OPTICAL SCANNER

(75) Inventor: Manfred Fechner, Villingen-Schwenningen (DE)

(73) Assignee: Thomson Licensing, Boulogne Billancourt (FR)

( * ) Notice: Subject to any disclaimer, the term of this patent is extended or adjusted under 35 U.S.C. 154(b) by 628 days.

(21) Appl. No.: 11/395,480

(22) Filed: Mar. 31, 2006

(65) Prior Publication Data

US 2006/0239141 A1 Oct. 26, 2006

(30) Foreign Application Priority Data

Apr. 20, 2005 (DE) .................. 10 2005 018 461

(51) Int. Cl.
*G11B 7/00* (2006.01)
(52) U.S. Cl. .................. 369/44.29; 369/44.35
(58) Field of Classification Search .............. 369/44.29, 369/44.35, 44.36
See application file for complete search history.

(56) References Cited

U.S. PATENT DOCUMENTS

| | | | | |
|---|---|---|---|---|
| 5,459,309 A * | 10/1995 | Kagami et al. | ........... | 250/201.5 |
| 5,532,990 A | 7/1996 | Koyama et al. | | |
| 5,642,340 A * | 6/1997 | Nomura | ........... | 369/44.25 |
| 5,748,584 A * | 5/1998 | Maezawa | ........... | 369/44.29 |
| 5,751,675 A * | 5/1998 | Tsutsui et al. | ........... | 369/44.27 |
| 6,178,145 B1 * | 1/2001 | Hayashi et al. | ........... | 369/44.29 |
| 6,252,835 B1 | 6/2001 | Choi | | |
| 6,633,523 B1 * | 10/2003 | Masaki et al. | ........... | 369/44.32 |
| 6,747,924 B1 * | 6/2004 | Muramatsu | ........... | 369/44.29 |
| 6,934,227 B2 * | 8/2005 | Nakata et al. | ........... | 369/44.32 |
| 7,184,374 B2 * | 2/2007 | Chung et al. | ........... | 369/44.29 |
| 7,352,669 B2 * | 4/2008 | Huang et al. | ........... | 369/53.14 |
| 7,362,672 B2 * | 4/2008 | Huang et al. | ........... | 369/47.44 |
| 7,502,286 B2 * | 3/2009 | Hayashi et al. | ........... | 369/44.32 |
| 7,522,482 B2 * | 4/2009 | Tateishi et al. | ........... | 369/44.29 |
| 7,525,883 B2 * | 4/2009 | Yoshikawa et al. | ........... | 369/44.29 |
| 2002/0101800 A1 | 8/2002 | Kubota | | |
| 2003/0053387 A1 | 3/2003 | Lee et al. | | |
| 2005/0128898 A1 * | 6/2005 | Hayashi et al. | ........... | 369/44.28 |
| 2005/0180276 A1 * | 8/2005 | Watanabe et al. | ........ | 369/44.29 |

FOREIGN PATENT DOCUMENTS

| | | |
|---|---|---|
| DE | 696 07 458 T2 | 10/1997 |
| EP | 0 155 077 B1 | 9/1985 |
| EP | 0 260 637 A2 | 3/1988 |
| EP | 0 500 547 B1 | 9/1992 |

OTHER PUBLICATIONS

Search Report Dated Jun. 21, 2005.

\* cited by examiner

*Primary Examiner*—Thang V Tran
(74) *Attorney, Agent, or Firm*—Robert D. Shedd; Robet B. Levy; Jorge Tony Villabon

(57) ABSTRACT

The present invention relates to a method for correcting the operating point of a focus control loop for a scanner for optical storage media. According to the invention, the method comprises the steps of: extracting from a focus error signal (FE) a signal component caused by vertical wobble of the optical storage medium; integrating the extracted signal component; and correcting the operating point with the aid of the integrated signal.

8 Claims, 3 Drawing Sheets

FOCUS CONTROL FOR OPTICAL SCANNER

This application claims the benefit, under 35 U.S.C. 119, of German patent application no. 102005018461.8 filed 20 Apr. 2005.

FIELD OF THE INVENTION

The present invention relates to a method for correcting the operating point of a focus control loop for a scanner for optical storage media, a focus control loop which uses this method, and a device for reading from and/or writing to optical storage media which uses such a method or such a focus control loop.

BACKGROUND OF THE INVENTION

During the focal search, in devices for reading from and/or writing to optical storage media such as, for example, CD (Compact Disc) or DVD (Digital Versatile Disc), the focal distance of an objective lens is determined via an information layer of the optical storage medium, and a focus control loop is subsequently closed. The focal distance ascertained determines the operating point about which the focus control loop exerts control. During operation, the focus control loop then keeps the objective lens at the focal distance with the aid of an actuator. An existing measurement error, that is to say deviation of the operating point from the true focal distance, is corrected in this case by the focus control loop. However, the measurement error causes a steady-state system deviation in the focus control loop. The measurement error is substantially determined by the inertia of the objective lens. The objective lens follows the voltage profile applied at the actuator during the focal search, doing so with a time offset. Once the objective lens reaches the focal distance, the focus control loop is closed, and the current voltage value is frozen. The true voltage value belonging to the focal distance has already been reached previously, however, and is currently being exceeded. The extent to which it is exceeded is a function of the dynamics of the system used. However, this is subject to manufacturing tolerances, and is therefore not known for the system in use.

SUMMARY OF THE INVENTION

It is desirable to have a method for focus control in the case of which a deviation of the operating point from the true focal distance is corrected.

According to the invention, a method for correcting the operating point of a focus control loop for a scanner for optical storage media has the steps of:
- extracting from a focus error signal a signal component caused by vertical wobble of the optical storage medium;
- integrating the extracted signal component; and
- correcting the operating point with the aid of the integrated signal.

The static operating point is set with the aid of the method presented here to the value which, during playback, lies in the middle between the highest and the lowest occurring focal point. The operating point is here the position which is occupied by the objective lens in the case of no interference with an open control loop. The method according to the invention corrects the deviation of the operating point from the true focal distance, and reduces the system deviation to zero. In order to correct the deviation, the system deviation caused by an existing vertical wobble is detected in the focus error signal. Even in the case of high quality optical storage media and high quality recording apparatuses for optical storage media, the occurrence of a vertical wobble cannot be avoided, because of mechanical limits and/or tolerances.

However, this vertical wobble can be very small. In focal distance, the object lens follows the vertical wobble, which has a sinusoidal profile about the focal distance. This profile occurs again in the focus error signal, in addition to other interference and noise. The sinusoidal signal is extracted from the focus error signal and amplified. The signal can be small and nonlinearly distorted in the case of high quality optical storage media, in particular of test media without vertical wobble, in conjunction with a high quality recording apparatus for the storage medium. On the other hand, with normal optical storage media the signal can be so large that the signal amplitude exceeds the maximum or minimum value of the computing range and is limited to these values, since the computer-logic unit limits upon overflowing. This does not effect the determination of the operating point, since in essence the zero crossings of the sinusoidal signal are important. The extracted and amplified sinusoidal signal is integrated and used as correction signal for the operating point of the focus control. The focus operating point in this case assumes exactly the value of the rest position about which the objective lens moves because of the vertical wobble. The measurement error occurring during the focal search is thereby corrected.

The achievable accuracy of the method according to the invention is better than 1 μm. For example, it is possible to use an 8 bit DAC (Digital-to-Analog converter) with resolution enhancement for driving the focus actuator. Here, the accuracy for DAC is better than 0.5 LSB, and a 16-bit resolution is achieved with the resolution enhancement. The 8-bit DAC achieves a resolution of 10 μm and an absolute accuracy of better than ±5 μm given an assumed adjustment path of 2.56 mm for the objective lens. The resolution enhancement expands the resolution to 16 bits, and the following quantization values are achieved:

nominal resolution step width: 39.0625 nm
maximum step width: 78.125 nm.

The operating point can be set precisely to ±1 step width with the aid of the controller.

The sinusoidal signal is advantageously extracted from the focus error signal with the aid of a lowpass filter. The lowpass filter preferably has a fixed cut-off frequency. However, it is likewise possible to use a variable lowpass filter whose cutoff frequency is selected as a function of the rotational rate of the storage medium. Since the vertical wobble causes a sinusoidal signal of low frequency, the sinusoidal signal can in this way easily be separated from the high frequency components of the focus control. Again, existing noise is thus at least partially suppressed.

The extracted sinusoidal signal is preferably converted into a rectangular signal of amplitude ±A before the integration. Although the sinusoidal signal originating from the lowpass filter can also be integrated directly, it has interference superimposed on it. The conversion into a rectangular signal has the effect that the positive and the negative half-waves are of equal length at the operating point, and this is used as a criterion for determining the operating point. In this way, the method is independent of the shape of the input signal and of any possible offset present, since the temporal relation between the positive and negative half-waves is used to determine the operating point.

In accordance with a further aspect of the invention, the rectangular signal is used as an index for angular measurements on the optical storage medium or to determine the speed of the optical storage medium. The rectangular signal obtained is phase-locked with the vertical wobble and thus with the optical storage medium. It therefore provides an angular reference point and has exactly the frequency of the current speed of the optical storage medium.

By way of example, it is advantageous to apply the rectangular signal phase-locked with the vertical wobble to portable devices for replaying or writing to optical storage media. Particularly with such devices, it is desirable for the purpose of saving energy not to operate the read or write laser continuously. When the read laser is switched on, data are read at an increased data rate and buffered in a read memory. As soon as the read memory is full, the read laser is switched off and the data stored in the read memory are replayed at the normal data rate. Before the read memory is empty, the read laser is switched on again and data are read into the read memory once again. In a similar way, data buffered in a write memory are written to the storage medium at an increased data rate. Before the write memory is empty, the write laser is switched off and the write memory is filled with new data. As soon as the write memory is full, the write laser is switched on again and the stored data are written to the storage medium. With the read or write laser switched off, the focus control loop is opened and the objective lens assumes the position of the operating point. When the read or write laser is switched on again, the focal distance must now be determined again and the focus control loop must be closed. The rectangular signal is advantageously used to this end. The idea here is to maintain the position of the objective lens and to wait until an information layer of the optical storage medium traverses the focus plane. This happens twice per revolution of the storage medium at a speed of 20 revolutions per second, for example every 25 msec. A PLL (phase-locked loop) is synchronized with the rectangular signal in order to control the coupling instance and the coupling direction. In this case, the PLL is synchronized in an edge-triggered fashion and keeps the frequency and phase relationship freewheeling when trigger signals are absent. Independently of its stability and of the speed stability, for a certain period this PLL supplies adequate phase information for determining the instant of the coupling point.

In comparison with an active focal search in which the objective lens traverses a ramp, for example with a ramp period of 250 msec, the above-described passive method is approximately 10 times faster. Since, moreover, only the information layer is moved through the stationary focal point of the objective lens, the traversal speed is minimal. Preconditions for coupling are therefore very good.

It is further desirable to have a focus control loop in the case of which a deviation of the operating point from the true focal distance is corrected.

According to the invention, a focus control loop for a scanner for optical storage media comprises:
 a filter for extracting from a focus error signal a signal component caused by a vertical wobble of the optical storage medium;
 an integrator for integrating the extracted signal component; and
 means for correcting the operating point with the aid of the integrated signal.

The filter is preferably a lowpass filter. Moreover, it is advantageous when the focus control loop has a comparator for converting the extracted signal component into a rectangular signal of prescribed amplitude.

An inventive method for correcting the operating point of a focus control loop, or an inventive focus control loop is advantageously used in a device for reading from and/or writing to optical storage media.

BRIEF DESCRIPTION OF THE DRAWINGS

The invention is to be explained below for the purpose of added comprehension with the aid of FIGS. 1 to 4. Identical reference numerals denote identical elements in this case. In the drawing.

DETAILED DESCRIPTION OF PREFERRED EMBODIMENTS

Figure 1:
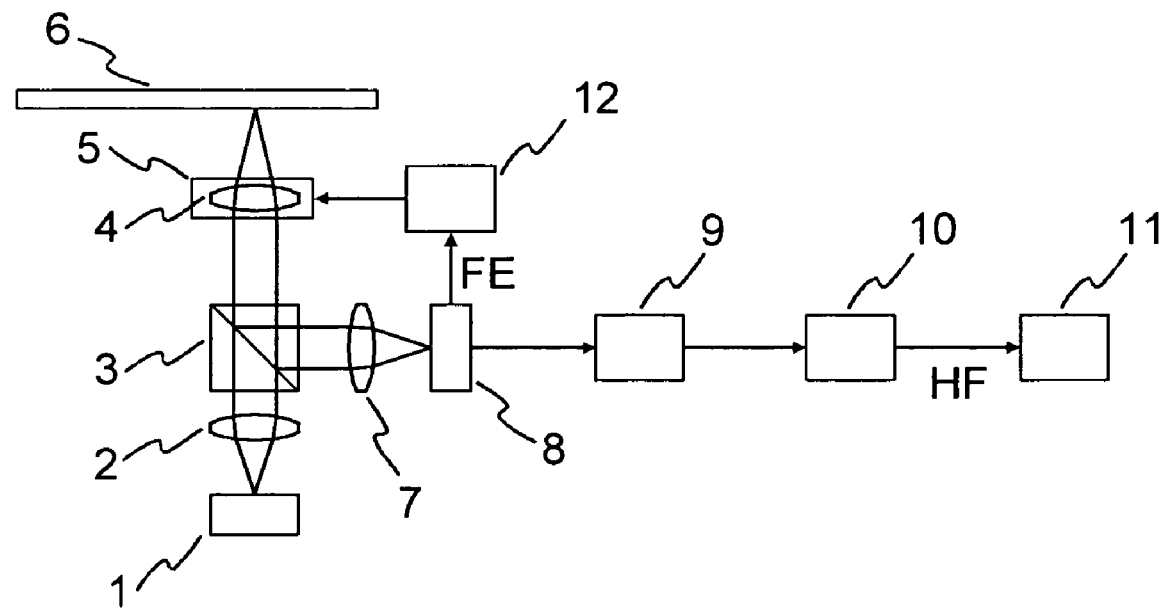
FIG. 1: shows a diagrammatic illustration of a device for reading from and/or writing to optical storage media.

FIG. 1 shows a diagrammatic illustration of a device for reading from and/or writing to optical storage media. A laser diode 1 emits a light beam which is collimated by a collimator lens 2, transmits a beam splitter cube 3 and is focused onto an optical storage medium 6 by an objective lens 4. The objective lens 4 is moved with the aid of an actuator 5 in such a way that the light beam is aligned exactly with a track of the optical storage medium 6. The light beam reflected by the optical storage medium 5 is collimated by the objective lens 4 and deflected by the beam splitter cube 3 in the direction of a further objective lens 7, which focuses it onto a photodetector 8. The photodetector 8 generates analog output signals which are amplified by an amplifier 9 and converted by an analog-to-digital converter 10 into digital output signals HF. An evaluation electronics 11 obtains a digital data signal from the digital output signals. Furthermore, a focus error signal FE which is fed to a focus control loop 12 is obtained from the output signals of the photodetector 8. Said focus control loop controls the position of the objective lens 4 relative to the optical storage medium 6 on the basis of the focus error signal with the aid of the actuator 5.

Figure 2:
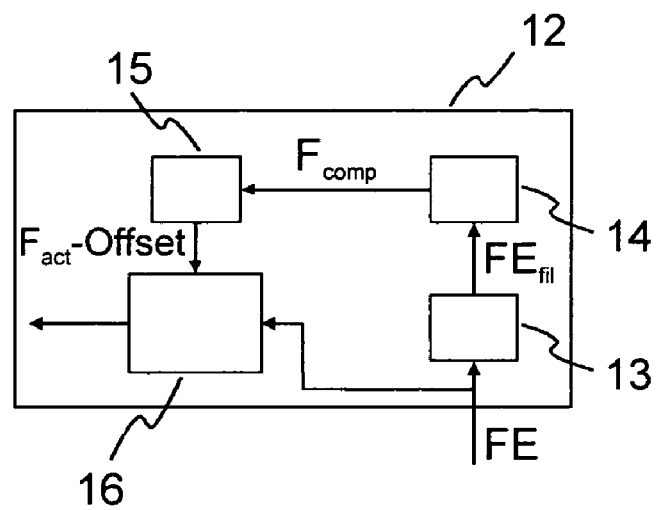
FIG. 2: shows a focus control loop according to the invention.
Figure 3:
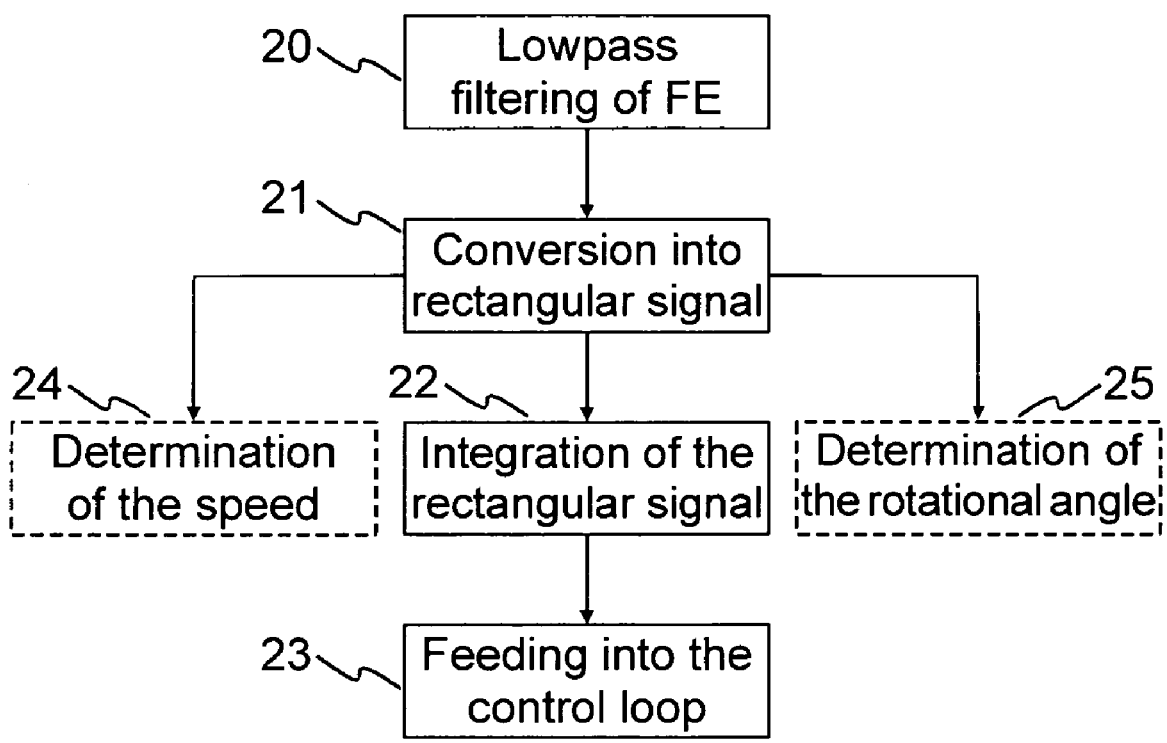
FIG. 3: shows a flowchart of a method in accordance with the invention for correcting the operating point of a focus control loop.

A diagrammatic illustration of a focus control loop 12 according to the invention is shown in FIG. 2. The flowchart of the corresponding method is illustrated in FIG. 3. The focus control loop 12 according to the invention comprises at least one lowpass filter 13, a comparator 14, an integrator 15 and the actual control loop 16 known from the prior art. Firstly, in a step 20 the signal $FE_{fil}$ caused by the vertical wobble is extracted from the focus error signal FE with the aid of the lowpass filter 13 and amplified. The extracted and amplified signal is fed to the comparator 14, which converts it in the next step 21 into a rectangular signal $F_{comp}$ of prescribed amplitude. The rectangular signal $F_{comp}$ is integrated with the aid of the integrator 15, step 22, and fed to the control loop 16 as correction signal $F_{act}$-Offset for the focus operating point, step 23. As an option, in step 24 the speed of the optical storage medium 6 and/or in step 25 the rotational angle of the optical storage medium 6 are/is determined from the rectangular signal $F_{comp}$.

Figure 4:
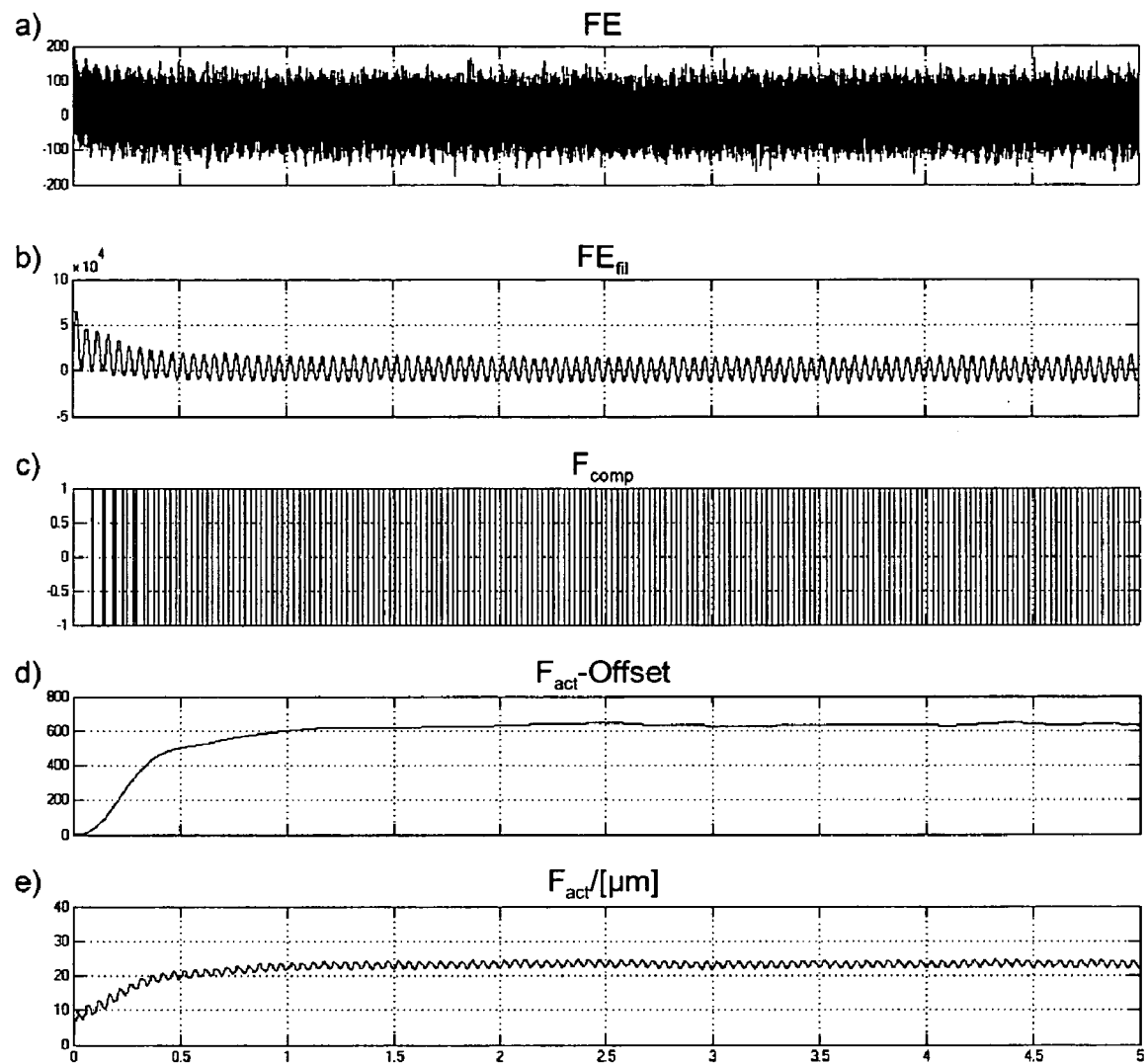
FIG. 4: shows an exemplary signal profile of the signals occurring in the focus control loop.

FIG. 4 reproduces an exemplary signal profile of the signals occurring in the focus control loop 12 during closure of the focus control loop 12. This is a simulation of a typical signal profile in a system with very small vertical wobble and nonlinear input profile, and this represents a critical case. The signal amplitude in arbitrary units is in each case plotted against time. Part a) of FIG. 4 shows the focus error signal FE in the case of which the profile of the vertical wobble is covered by the signal component of the normal focus deviations. Part b) of FIG. 4 shows the amplified and focus error signal $FE_{fil}$ which has been subjected to lowpass filtering and is caused essentially by the vertical wobble. The deviation from the operating point is greater here than the amplitude of the vertical wobble, and the control loop corrects the offset. The rectangular signal $F_{comp}$ at the output of the comparator 14 is illustrated in part c) of FIG. 4, while the rectangular signal $F_{act}$-Offset integrated by the integrator 15, that is to say the integrated offset, is illustrated in part d). Part e) of FIG. 4 shows the actual lens movement. The profile of the vertical wobble, and the high-frequency correction movements were added in the focus control loop 12 to the offset ascertained, this being done in accordance with the focus error signal FE. The high frequency components are, however, filtered by the lowpass characteristic of the actuator, and are not reflected in the lens movement since, caused by the mass, the behavior of the actuator corresponds to a second-order lowpass filter.

What is claimed is:

1. Method for correcting the operating point of a focus control loop for a scanner for optical storage media, comprising the steps of:
    extracting from a focus error signal (FE) a periodical signal component ($FE_{fil}$) caused by a vertical wobble of the optical storage medium;
    converting the extracted signal component ($FE_{fil}$) into a rectangular signal ($F_{comp}$) of prescribed amplitude;
    integrating the rectangular signal ($F_{comp}$); and
    feeding the integrated signal ($F_{act}$-Offset) to the focus control loop for correcting the operating point.

2. Method according to claim 1, in which the signal component ($FE_{fil}$) caused by the vertical wobble is extracted from the focus error signal (FE) by means of lowpass filtering.

3. Focus control loop for a scanner for optical storage media, comprising:
    a filter for extracting from a focus error signal (FE) a periodical signal component ($FE_{fil}$) caused by a vertical wobble of the optical storage medium;
    a comparator for converting the extracted signal component ($FE_{fil}$) into a rectangular signal ($F_{comp}$) of prescribed amplitude;
    an integrator for integrating the rectangular signal ($F_{comp}$); and
    means for correcting the operating point of the focus control loop using the integrated signal ($F_{act}$-Offset).

4. Focus control loop according to claim 3, in which the filter is a lowpass filter.

5. Device for reading from and/or writing to optical storage media, having a focus control loop in accordance with claim 3.

6. Method for determining the speed of an optical storage medium, comprising the steps of:
    extracting from a focus error signal (FE) a periodical signal component ($FE_{fil}$) caused by a vertical wobble of the optical storage medium;
    converting the extracted signal component ($FE_{fil}$) into a rectangular signal ($F_{comp}$) of prescribed amplitude; and
    determining the speed of the optical storage medium from the rectangular signal ($F_{comp}$).

7. Method for determining the rotational angle of an optical storage medium, comprising the steps of:
    extracting from a focus error signal (FE) a periodical signal component ($FE_{fil}$) caused by a vertical wobble of the optical storage medium;
    converting the extracted signal component ($FE_{fil}$) into a rectangular signal ($F_{comp}$) of prescribed amplitude; and
    determining the rotation angle of the optical storage medium from the rectangular signal ($F_{comp}$).

8. Method for coupling a focus control loop for an optical storage medium, comprising the steps of:
    extracting from a focus error signal (FE) a periodical signal component ($FE_{fil}$) caused by vertical wobble of the optical storage medium;
    converting the extracted signal component ($FE_{fil}$) into a rectangular signal ($F_{comp}$) of prescribed amplitude;
    synchronizing a PLL with the rectangular signal ($F_{comp}$) given a closed focus control loop;
    opening the focus control loop;
    determining a coupling point for the focus control loop using the PLL in a freewheeling state ; and
    closing the focus control loop at the coupling point.

* * * * *

UNITED STATES PATENT AND TRADEMARK OFFICE
CERTIFICATE OF CORRECTION

PATENT NO. : 7,602,680 B2 Page 1 of 1
APPLICATION NO. : 11/395480
DATED : October 13, 2009
INVENTOR(S) : Manfred Fechner It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Fifth Day of October, 2010

David J. Kappos
*Director of the United States Patent and Trademark Office*